United States Patent
Yamamoto et al.

(10) Patent No.: US 11,041,038 B2
(45) Date of Patent: Jun. 22, 2021

(54) WATER REPELLENT COMPOSITION

(71) Applicants: DAIKIN INDUSTRIES, LTD., Osaka (JP); NOF Corporation, Tokyo (JP)

(72) Inventors: Yuuki Yamamoto, Osaka (JP); Norimasa Uesugi, Osaka (JP); Ikuo Yamamoto, Osaka (JP); Kei-ichi Maruyama, Amagasaki (JP); Mitsuhiro Fukushima, Amagasaki (JP); Muneaki Iizuka, Amagasaki (JP)

(73) Assignees: DAIKIN INDUSTRIES, LTD., Osaka (JP); NOF CORPORATION, Tokyo (JP)

( * ) Notice: Subject to any disclaimer, the term of this patent is extended or adjusted under 35 U.S.C. 154(b) by 8 days.

(21) Appl. No.: 16/635,048

(22) PCT Filed: Jul. 13, 2018

(86) PCT No.: PCT/JP2018/026572
§ 371 (c)(1),
(2) Date: Jan. 29, 2020

(87) PCT Pub. No.: WO2019/026593
PCT Pub. Date: Feb. 7, 2019

(65) Prior Publication Data
US 2020/0239613 A1  Jul. 30, 2020

(30) Foreign Application Priority Data
Jul. 31, 2017 (JP) .............................. JP2017-148242

(51) Int. Cl.
| | |
|---|---|
| *C08F 220/36* | (2006.01) |
| *C08F 220/34* | (2006.01) |
| *C08F 214/06* | (2006.01) |
| *C08F 214/08* | (2006.01) |
| *C08F 220/58* | (2006.01) |
| *D06M 15/248* | (2006.01) |
| *D06M 15/285* | (2006.01) |

(52) U.S. Cl.
CPC .......... *C08F 220/36* (2013.01); *C08F 214/06* (2013.01); *C08F 214/08* (2013.01); *C08F 220/346* (2020.02); *C08F 220/58* (2013.01); *D06M 15/248* (2013.01); *D06M 15/285* (2013.01)

(58) Field of Classification Search
CPC .. C08F 220/36; C08F 220/346; C08F 220/58; C08F 214/06; C08F 214/08; D06M 15/248; D06M 15/285

USPC ......................................................... 526/312
See application file for complete search history.

(56) References Cited

U.S. PATENT DOCUMENTS

| | | | |
|---|---|---|---|
| 5,225,480 A * | 7/1993 | Tseng ..................... C08F 220/28 524/812 |
| 2013/0165006 A1* | 6/2013 | Yoshino ............. C08G 18/7831 442/86 |
| 2017/0218151 A1* | 8/2017 | Hanazawa ................ C08J 7/043 |

FOREIGN PATENT DOCUMENTS

| | | | |
|---|---|---|---|
| EP | 3 757 187 A1 | 12/2020 | |
| JP | 49085390 A * | 9/1974 | |
| JP | 2006-328624 A | 12/2006 | |
| JP | 2015120895 A * | 7/2015 | ........... C14C 11/003 |
| WO | 2015/076347 A1 | 5/2015 | |
| WO | 2015/080026 A1 | 6/2015 | |
| WO | 2019/163570 A1 | 8/2019 | |

OTHER PUBLICATIONS

International Preliminary Report on Patentability with Translation of Written Opinion of the International Searching Authority for PCT/JP2018/026572 dated Feb. 13, 2020.
International Search Report for PCT/JP2018/026572 dated Oct. 9, 2018 [PCT/ISA/210].
Extended European Search Report dated Apr. 8, 2021, issued by the European Patent Office in application No. 18840601.1.

* cited by examiner

*Primary Examiner* — Michael Bernshteyn
(74) *Attorney, Agent, or Firm* — Sughrue Mion, PLLC

(57) ABSTRACT

Provided is a water repellent composition which does not use a fluorine-containing monomer, especially a fluoroalkyl group-containing monomer. A water repellent composition which contains (1) (a) a polymer which has a repeating unit derived from an amide group-containing monomer that is represented by formula:

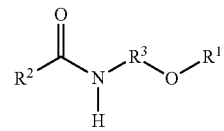

(wherein R1 represents an organic residue having an ethylenically unsaturated polymerizable group; R2 represents a hydrocarbon group having 7-30 carbon atoms; and R3 represents a hydrocarbon group having 1-5 carbon atoms) in an amount of 2-100% by weight relative to the polymer, and (2) a liquid medium.

12 Claims, No Drawings

WATER REPELLENT COMPOSITION

CROSS REFERENCE TO RELATED APPLICATIONS

This application is a National Stage of International Application No. PCT/JP2018/026572 filed Jul. 13, 2018, claiming priority based on Japanese Patent Application No. 2017-148242 filed Jul. 31, 2017.

TECHNICAL FIELD

The present invention relates to a water-repellent composition.

BACKGROUND ART

Conventionally, fluorine-containing water- and oil-repellent agents comprising a fluorine compound have been known. These water- and oil-repellent agents exhibit good water- and oil-repellency when used for a substrate such as textile products.

Recent research findings, for example, an EPA report: "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf), have shown an increasing concern about a load on the environment caused by PFOA (perfluorooctanoic acid) which is one of long-chain fluoroalkyl compounds. On Apr. 14, 2003, EPA (United States Environmental Protection Agency) announced the enhancement of scientific research on PFOA.

Meanwhile, Federal Register (FR Vol. 68, No. 73/Apr. 16, 2003 [FRL-2303-8], http://www.epa.gov/opptintr/pfoa/pfoafr.pdf), EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) have disclosed the possibility of generation of PFOA when a telomer is decomposed or metabolized (the telomer means a long-chain fluoroalkyl group). They also have said that telomers are used for various products having water- and oil-repellency and antifouling properties, such as foam fire extinguishers, care products, washing products, carpets, textile, paper and leather. There is the concern that fluorine-containing compounds are accumulated in the environment.

JP 2006-328624A discloses a water-repellent agent comprising a fluorine-free polymer comprising, as a monomer unit, a (meth)acrylic acid ester having 12 or more carbon atoms in the ester moiety, wherein the proportion of the (meth)acrylic acid ester is 80 to 100% by mass, based on the total amount of the monomer unit constituting the fluorine-free polymer.

This water-repellent agent, however, has poor water-repellency.

WO 2015/076347 discloses a surface treatment agent comprising a fluorine-free polymer made of a long chain (meth)acrylate ester monomer and an amidoamine surfactant. WO 2015/080026 discloses a surface treatment agent comprising a long chain (meth)acrylate ester monomer and a (meth)acrylate monomer containing a cyclic hydrocarbon group. A fluoroalkyl group-containing monomer is not used in these surface treatment agents.

CITATION LIST

Patent Literature

[Patent Literature 1] JP 2006-328624A
[Patent Literature 2] WO 2015/076347 (Japanese Patent Application No. 2013-241865)
[Patent Literature 3] WO 2015/080026 (Japanese Patent Application No. 2013-241980)

SUMMARY OF INVENTION

Technical Problem

An object of the present invention is to provide a water-repellent composition which gives good water-repellency and which does not comprise a fluoroalkyl group-containing monomer, preferably a fluorine-containing monomer.

Solution to Problem

The present invention relates to a polymer comprising:
a repeating unit derived from an amide group-containing monomer represented by the formula:

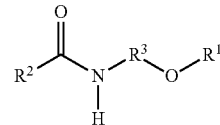

[Formula 1]

wherein $R^1$ is an organic residue having an ethylenically unsaturated polymerizable group,
$R^2$ is a hydrocarbon group having 7 to 30 carbon atoms, and
$R^3$ is a hydrocarbon group having 1 to 5 carbon atoms.

An aspect of the present invention provides a water-repellent composition comprising:
(1) a polymer comprising
(a) 2 to 100% by weight, based on the polymer, of a repeating unit derived from an amide group-containing monomer represented by the formula:

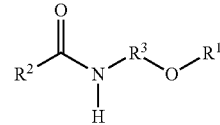

[Formula 2]

wherein $R^1$ is an organic residue having an ethylenically unsaturated polymerizable group,
$R^2$ is a hydrocarbon group having 7 to 30 carbon atoms, and
$R^3$ is a hydrocarbon group having 1 to 5 carbon atoms;
and
(2) a liquid medium.

Advantageous Effects of Invention

The water-repellent composition of the present invention does not use a fluoroalkyl group-containing monomer, and thus is without the concern of accumulation of fluorine-containing compounds in the environment. The water-repellent composition of the present invention gives excellent water-repellency to a substrate.

The water-repellent composition of the present invention has good stability, i.e., stability of emulsion. The water-repellent composition of the present invention has excellent durability (in particular, washing durability) of water- and oil-repellency (in particular, water-repellency). The water-repellent composition of the present invention also has excellent processing stability in the treatment with the water-repellent agent.

DESCRIPTION OF EMBODIMENTS

The water-repellent composition comprises (1) a polymer and (2) a liquid medium. The water-repellent composition may also comprise (3) a surfactant.
(1) Polymer The polymer according to the present invention is a polymer which does not have a fluoroalkyl group. It is preferable that the polymer according to the present invention is a fluorine-free polymer which does not have a fluorine atom.

In the present invention, the polymer has a repeating unit derived from an amide group-containing monomer (a).

The polymer may further have a repeating unit derived from a polymerizable monomer other than the amide group-containing monomer (a), preferably a fluorine-free polymerizable monomer other than the monomer (a).

The polymerizable monomer other than the monomer (a) may be a fluorine-free non-crosslinkable monomer or a fluorine-free crosslinkable monomer.

The fluorine-free non-crosslinkable monomer may be a compound represented by the formula:

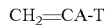

wherein A is a hydrogen atom, a methyl group or a halogen atom other than a fluorine atom (e.g., a chlorine atom, a bromine atom and an iodine atom), T is a hydrogen atom, a halogen atom other than a fluorine atom (e.g., a chlorine atom, a bromine atom and an iodine atom), a chain or cyclic hydrocarbon group having 1 to 40 carbon atoms, or a chain or cyclic organic group having an ester bond and having 2 to 41 carbon atoms.

Examples of the chain or cyclic hydrocarbon group having 1 to 40 carbon atoms include a linear or branched, saturated or unsaturated (e.g., ethylenically unsaturated) aliphatic hydrocarbon group having 1 to 40 carbon atoms, a saturated or unsaturated (e.g., ethylenically unsaturated) cycloaliphatic group having 4 to 40 carbon atoms, an aromatic hydrocarbon group having 6 to 40 carbon atoms, and an aromatic aliphatic hydrocarbon group having 7 to 40 carbon atoms.

Examples of the chain or cyclic organic group having an ester bond and having 2 to 41 carbon atoms include —C(=O)—O-Q and —O—C(=O)-Q,
wherein Q is a linear or branched, saturated or unsaturated (e.g., ethylenically unsaturated) aliphatic hydrocarbon group having 1 to 40 carbon atoms, a saturated or unsaturated (e.g., ethylenically unsaturated) cycloaliphatic group having 4 to 40 carbon atoms, an aromatic hydrocarbon group having 6 to 40 carbon atoms, and an aromatic aliphatic hydrocarbon group having 7 to 40 carbon atoms.

The fluorine-free crosslinkable monomer is as described later.

Examples of the polymerizable monomer other than the monomer (a) are as follows:
(b) acrylate ester monomer,
(c) fluorine-free crosslinkable monomer, and
(d) a halogenated olefin.

The polymer may have a fluorine atom, but it is preferable that the polymer does not have a fluorine atom. In other words, it is preferable that the polymer is a fluorine-free polymer, and all monomers are a fluorine-free monomer.
(a) Amide Group-Containing Monomer The amide group-containing monomer is a compound represented by the formula:

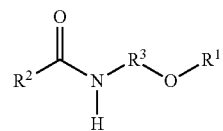

[Formula 3]

wherein $R^1$ is an organic residue having an ethylenically unsaturated polymerizable group, $R^2$ is a hydrocarbon group having 7 to 30 carbon atoms, and $R^3$ is a hydrocarbon group having 1 to 5 carbon atoms.

The amide group-containing monomer does not have a fluoroalkyl group.

$R^1$ is an organic residue having an ethylenically unsaturated polymerizable group, and is not limited as long as it has a double bond between carbon atoms. Specific examples of the organic residue include organic residues having an ethylenically unsaturated polymerizable group, such as —C(=O)CR$^{11}$=CH$_2$, —CHR$^{11}$=CH$_2$ and —CH$_2$CHR$^{11}$=CH$_2$, wherein R$^{11}$ is a hydrogen atom or an alkyl group having 1 to 4 carbon atoms. $R^1$ may also have various organic groups in addition to the ethylenically unsaturated polymerizable group. Examples of the various organic groups include an organic group such as a chain hydrocarbon, a cyclic hydrocarbon, a polyoxyalkylene group and a polysiloxane group. These organic groups may be substituted with various substituents.

$R^2$ is a hydrocarbon group having 7 to 30 carbon atoms and examples of the hydrocarbon group include a chain hydrocarbon and a cyclic hydrocarbon. Among them, the chain hydrocarbon is preferred, and a linear saturated hydrocarbon group is particularly preferred. The number of carbon atoms of $R^2$ is 7 to 30, preferably 11 to 27, and particularly preferably 15 to 23.

$R^3$ is a hydrocarbon group having 1 to 5 carbon atoms. The hydrocarbon group having 1 to 5 carbon atoms may be linear or branched, may have an unsaturated bond, and is preferably linear. The number of carbon atoms of $R^3$ is preferably 2 to 4, and particularly preferably 2. It is preferable that $R^3$ is an alkylene group.

The amide group-containing monomer may be a monomer wherein $R^2$ is a single type (e.g., only a compound wherein $R^2$ has 17 carbon atoms), or a monomer wherein a plurality of $R^1$ are combined (e.g., a mixture of a compound wherein $R^2$ has 17 carbon atoms and a compound wherein $R^2$ has 15 carbon atoms).

Examples of the amide group-containing monomer include palmitic acid amide ethyl (meth)acrylate, stearic acid amide ethyl (meth)acrylate, behenic acid amide ethyl (meth)acrylate, myristic acid amide ethyl (meth)acrylate, lauric acid amide ethyl (meth)acrylate, isostearic acid ethylamide (meth)acrylate, oleic acid ethylamide (meth)acrylate, tert-butylcyclohexyl caproic acid amide ethyl (meth) acrylate, adamantanecarboxylic acid ethylamide (meth) acrylate, naphthalenecarboxylic acid amide ethyl (meth) acrylate, anthracenecarboxylic acid amide ethyl (meth) acrylate, palmitic acid amide propyl (meth)acrylate, stearic acid amide propyl (meth)acrylate, palmitic acid amide ethyl vinyl ether, stearic acid amide ethyl vinyl ether, palmitic acid amide ethyl allyl ether, stearic acid amide ethyl allyl ether, and a mixture thereof.

It is preferable that the amide group-containing monomer is stearic acid amide ethyl (meth)acrylate. The amide group-containing monomer may be a mixture containing stearic acid amide ethyl (meth)acrylate. The amount of stearic acid amide ethyl (meth)acrylate in the mixture containing stearic acid amide ethyl (meth)acrylate may be, for example 55 to 99% by weight, preferably 60 to 85% by weight, and further preferably 65 to 80% by weight, based on the total weight of the amide group-containing monomer. The rest of the monomers may be, for example, palmitic acid amide ethyl (meth)acrylate.

(b) Acrylate Ester Monomer

The polymer may have a repeating unit derived from another acrylate ester monomer.

Examples of the other acrylate ester monomer are as follows:

(b1) an acrylate ester monomer containing an aliphatic hydrocarbon group, and (b2) an acrylate ester monomer containing a cyclic hydrocarbon group.

The polymer may have a repeating unit derived from at least one monomer selected from the group consisting of the monomer (b1) and the monomer (b2).

(b1) Acrylate Ester Monomer Containing Aliphatic Hydrocarbon Group

The polymer may have a repeating unit derived from an acrylate ester monomer containing an aliphatic hydrocarbon group. The acrylate ester monomer containing an aliphatic hydrocarbon group is a (meth)acrylate eater (i.e., acrylate or methacrylate).

A preferred example of the acrylate ester monomer containing an aliphatic hydrocarbon group is a compound represented by the formula:

$$CH_2=CA^{11}\text{-}C(=O)\text{—}O\text{-}A^{12}$$

wherein $A^{11}$ is a hydrogen atom or a methyl group, $A^{12}$ is a linear or branched aliphatic hydrocarbon group having 1 to 40 carbon atoms.

The acrylate ester monomer containing an aliphatic hydrocarbon group does not have a fluoroalkyl group. The acrylate ester monomer containing an aliphatic hydrocarbon group may have a fluorine atom, but it is preferable that the acrylate ester monomer containing an aliphatic hydrocarbon group does not have a fluorine atom.

$A^{12}$ is a linear or branched hydrocarbon group. The linear or branched hydrocarbon group may be particularly a linear hydrocarbon group. The linear or branched hydrocarbon group has 1 to 40, for example, 10 to 40, and preferably 18 to 40 carbon atoms. The linear or branched hydrocarbon group preferably has 18 to 28 carbon atoms, particularly 18 or 22 carbon atoms. It is preferable that the linear or branched hydrocarbon group is usually a saturated aliphatic hydrocarbon group, particularly an alkyl group.

Specific examples of the acrylate ester monomer containing an aliphatic hydrocarbon group include lauryl (meth) acrylate, cetyl (meth)acrylate, stearyl (meth)acrylate and behenyl (meth)acrylate.

The presence of the acrylate ester containing an aliphatic hydrocarbon group provides a softer feeling.

(b2) Acrylate Ester Monomer Containing Cyclic Hydrocarbon Group

The polymer may have a repeating unit derived from an acrylate ester monomer containing a cyclic hydrocarbon group.

It is preferable that the acrylate ester monomer containing a cyclic hydrocarbon group is a compound represented by the formula:

$$CH_2=CA^{21}\text{-}C(=O)\text{—}O\text{-}A^{22}$$

wherein $A^{21}$ is a hydrogen atom, a methyl group, a halogen, a linear or branched alkyl group having 2 to 21 carbon atoms, a $CFX^1X^2$ group (wherein $X^1$ and $X^2$ are a hydrogen atom, a fluorine atom, a chlorine atom, a bromine atom or an iodine atom), a cyano group, a linear or branched fluoroalkyl group having 1 to 21 carbon atoms, a substituted or non-substituted benzyl group, or a substituted or non-substituted phenyl group, and $A^{22}$ is a group containing a cyclic hydrocarbon group having 4 to 40 carbon atoms.

It is preferable that the acrylate ester monomer containing a cyclic hydrocarbon group is a monomer whose homopolymer has a high glass transition temperature (for example, 50° C. or more, in particular, 80° C. or more).

The acrylate ester monomer containing a cyclic hydrocarbon group does not have a fluoroalkyl group. The acrylate ester monomer containing a cyclic hydrocarbon group may have a fluorine atom, but it is preferable that the acrylate ester monomer containing a cyclic hydrocarbon group does not have a fluorine atom.

Examples of $A^{22}$ include a hydrogen atom, a methyl group, Cl, Br, I, F, CN and $CF_3$. It is preferable that $A^{21}$ is a chlorine atom.

$A^{22}$ is a cyclic hydrocarbon group which may have a chain group (e.g., a linear or branched hydrocarbon group). Examples of the cyclic hydrocarbon group include a saturated or unsaturated monocyclic group, polycyclic group, or bridged ring group. It is preferable that the cyclic hydrocarbon group is saturated. The number of carbon atoms of the cyclic hydrocarbon group is 4 to 40, and preferably 6 to 20. Examples of the cyclic hydrocarbon group include a cycloaliphatic group having 4 to 20, particularly 5 to 12 carbon atoms, an aromatic group having 6 to 20 carbon atoms, and an aromatic aliphatic group having 7 to 20 carbon atoms. The number of carbon atoms of the cyclic hydrocarbon group is 15 or less, and for example, preferably 12 or less. It is preferable that the cyclic hydrocarbon group is a saturated cycloaliphatic group. Specific examples of the cyclic hydrocarbon group include a cyclohexyl group, a t-butylcyclohexyl group, an isobornyl group, a dicyclopentanyl group and a dicyclopentenyl group.

Specific examples of the acrylate ester monomer containing a cyclic hydrocarbon group include cyclohexyl acrylate, t-butylcyclohexyl acrylate, benzyl acrylate, isobornyl acrylate, dicyclopentanyl acrylate, dicyclopentenyl acrylate; and cyclohexyl methacrylate, t-butylcyclohexyl methacrylate, benzyl methacrylate, isobornyl methacrylate, dicyclopentanyl methacrylate and dicyclopentenyl methacrylate.

The presence of the acrylate ester monomer containing a cyclic hydrocarbon group improves processing stability and water-repellency.

(c) Fluorine-Free Crosslinkable Monomer

The polymer may have a repeating unit derived from a fluorine-free crosslinkable monomer.

The fluorine-free crosslinkable monomer is a monomer which does not have a fluorine atom. The fluorine-free crosslinkable monomer may be a compound having at least two reactive groups and/or ethylenic carbon-carbon double bonds (preferably, a (meth)acrylate group), and having no fluorine. The fluorine-free crosslinkable monomer may be a compound having at least two ethylenic carbon-carbon double bonds (preferably, a (meth)acrylate group), or a compound having at least one ethylenic carbon-carbon double bond and at least one reactive group. Examples of the reactive group include a hydroxyl group, an epoxy group, a chloromethyl group, a blocked isocyanate group, an amino group and a carboxyl group.

The fluorine-free crosslinkable monomer may be mono (meth)acrylate, di(meth)acrylate or mono(meth)acrylamide having a reactive group. Alternatively, the fluorine-free crosslinkable monomer may be di(meth)acrylate.

An example of the fluorine-free crosslinkable monomer is a vinyl monomer having a hydroxyl group.

Examples of the fluorine-free crosslinkable monomer include diacetone (meth)acrylamide, N-methylol (meth) acrylamide, hydroxyethyl (meth)acrylamide, hydroxymethyl (meth)acrylate, hydroxyethyl (meth)acrylate, 2,3-dihydroxypropyl (meth)acrylate, 3-chloro-2-hydroxypropyl (meth)acrylate, 2-acetoacetoxy ethyl (meth)acrylate, butadiene, isoprene, chloroprene, vinyl monochloroacetate, vinyl methacrylate, glycidyl (meth)acrylate, 1,4-butanediol di(meth)acrylate, 1,6-hexanediol di(meth)acrylate, 1,9-nonanediol di(meth)acrylate and neopentyl glycol di(meth) acrylate, but are not limited thereto.

The presence of the fluorine-free crosslinkable monomer improves washing durability provided by the polymer.

(d) Halogenated Olefin Monomer

The copolymer may have a repeating unit derived from a halogenated olefin monomer.

It is preferable that the halogenated olefin monomer does not have a fluorine atom.

It is preferable that the halogenated olefin monomer is an olefin substituted with 1 to 10 chlorine atoms, bromine atoms or iodine atoms and having 2 to 20 carbon atoms. It is preferable that the halogenated olefin monomer is a chlorinated olefin having 2 to 20 carbon atoms, particularly an olefin having 2 to 5 carbon atoms and having 1 to 5 chlorine atoms. Preferred examples of the halogenated olefin monomer include halogenated vinyl such as vinyl chloride, vinyl bromide and vinyl iodide, and halogenated vinylidene such as vinylidene chloride, vinylidene bromide and vinylidene iodide. Vinyl chloride is preferred because water-repellency (particularly durability of water-repellency) is increased.

The presence of the halogenated olefin increases washing durability provided by the polymer.

(e) Another Monomer

Another monomer (e) other than the monomers (a) to (d), for example, a fluorine-free non-crosslinkable monomer, may also be used.

Examples of the other monomer include ethylene, vinyl acetate, acrylonitrile, styrene, polyethylene glycol (meth) acrylate, polypropylene glycol (meth)acrylate, methoxypolyethylene glycol (meth)acrylate, methoxypolypropylene glycol (meth)acrylate and vinyl alkyl ether. The other monomer is not limited to these examples.

In the present description, "(meth)acrylate" means acrylate or methacrylate, and "(meth)acrylamide" means acrylamide or methacrylamide.

Each of the monomers (a) to (e) may be a single type or a mixture of two or more.

The amount of the monomer (a) is 2 to 100% by weight, based on the polymer. The lower limit of the amount of the monomer (a) may be 3% by weight, for example, 5% by weight, particularly 10% by weight, and especially 15% by weight, based on the polymer. Alternatively, the lower limit of the amount of the monomer (a) may be 20% by weight, for example, 25% by weight, particularly 30% by weight, and especially 40% by weight or 50% by weight, based on the polymer. The upper limit of the amount of the monomer (a) may be 95% by weight, for example, 80% by weight, 75% by weight, or 70% by weight, based on the polymer.

In the polymer, the amount of the repeating unit (b) may be 0 to 2,000 parts by weight, preferably 0 to 200 parts by weight, more preferably 1 to 100 parts by weight, and for example, 5 to 80 parts by weight; the amount of the repeating unit (c) may be 0 to 50 parts by weight, preferably 1 to 10 parts by weight, and for example, 2 to 8 parts by weight; the amount of the repeating unit (d) may be 0 to 100 parts by weight, preferably 1 to 60 parts by weight, and for example, 2 to 10 parts by weight; and the amount of the repeating unit (e) may be 0 to 100 parts by weight, preferably 1 to 30 parts by weight, and for example, 2 to 10 parts by weight, based on 100 parts by weight of the monomer (a).

In the polymer, the amount of each of the monomer (b1) and the monomer (b2) may be 0 to 150 parts by weight, preferably 1 to 100 parts by weight, and for example 2 to 50, based on 100 parts by weight of the monomer (a).

Alternatively, for the amount of the monomer (b), monomer (c), monomer (d) and monomer (e), a ratio of (b):(c): (d):(e) may be 0 to 80% by weight: 0 to 10% by weight: 0 to 40% by weight: 0 to 20% by weight, for example, 3 to 75% by weight: 0.5 to 5% by weight: 2 to 30% by weight: 0 to 10% by weight, particularly 10 to 701 by weight: 0.8 to 3% by weight: 5 to 25% by weight: 0 to 5% by weight, based on the polymer.

A number average molecular weight (Mn) of the polymer may be usually 1,000 to 1,000,000, for example, 5,000 to 500,000, and particularly 3,000 to 200,000. The number average molecular weight (Mn) of the polymer is usually measured by GPC (gel permeation chromatography).

In the present invention, monomers are polymerized to give a water-repellent composition in which polymer is dispersed or dissolved in a liquid medium.

The monomers used in the present invention are as follows:
monomer (a),
monomers (a)+(b),
monomers (a)+(b)+(c),
monomers (a)+(b)+(d), or
monomers (a)+(b)+(c)+(d).

In addition to the above, the monomer (e) may be used. The monomer (b) may be at least one of the monomer (b1) and the monomer (b2).

(2) Liquid Medium

The water-repellent composition comprises a liquid medium. The liquid medium is water, an organic solvent, or a mixture of water and an organic solvent.

The water-repellent composition is usually a solution or a dispersion. The solution means a solution of polymer dissolved in an organic solvent. The dispersion means an aqueous dispersion of polymer dispersed in an aqueous medium (water, or a mixture of water and an organic solvent).

Examples of the organic solvent include esters (e.g., esters having 2 to 30 carbon atoms, more specifically, ethyl acetate, butyl acetate), ketongs (e.g., ketones having 2 to 30 carbon atoms, more specifically, methyl ethyl ketone, diisobutyl ketone), alcohols (e.g., alcohols having 1 to 30 carbon atoms, more specifically, isopropyl alcohol), aromatic solvents (e.g., toluene and xylene), and petroleum solvents (e.g., alkanes having 5 to 10 carbon atoms, more specifically naphtha, kerosene).

The liquid medium may be water alone or a mixture of water and a water-compatible organic solvent. The amount of the organic solvent may be 30% by weight or less, for example, 10% by weight or less, and preferably 0.1% by weight or more, based on the liquid medium. It is preferable that the liquid medium is water alone.

(3) Surfactant

It is preferable that when the water-repellent composition is in the form of an aqueous dispersion, the composition contains a surfactant.

In the water-repellent composition of the present invention, the surfactant includes a nonionic surfactant. Furthermore, it is preferable that the surfactant comprises at least one surfactant selected from a cationic surfactant, an anionic surfactant and an amphoteric surfactant. The use of the nonionic surfactant and the cationic surfactant in combination is preferred.

(3-1) Nonionic Surfactant

Examples of the nonionic surfactant include ethers, esters, eater ethers, alkanolamides, polyhydric alcohols and amine oxides.

Examples of the ethers include compounds having an oxyalkylene group, preferably a polyoxyethylene group.

Examples of the esters include esters of alcohol and fatty acid. Examples of the alcohols include 1 to 6-hydric (in particular, 2 to 5-hydric) alcohols having 1 to 50 (in particular, 10 to 30) carbon atoms, such as aliphatic alcohols. Examples of the fatty acids include saturated or unsaturated fatty acids having 2 to 50, in particular, 5 to 30 carbon atoms.

Examples of the ester ethers include a compound with alkylene oxide (in particular, ethylene oxide) added to an ester of alcohol and fatty acid. Examples of the alcohols include monohydric to hexahydric (in particular, dihydric to pentahydric) alcohols having 1 to 50 (in particular, 3 to 30) carbon atoms, such as aliphatic alcohols. Examples of the fatty acids include saturated or unsaturated fatty acids having 2 to 50, in particular, 5 to 30 carbon atoms.

Examples of the alkanolamides include those formed of fatty acid and alkanolamine. Alkanolamide may be monoalkanolamide or dialkanolamide. Examples of the fatty acids include saturated or unsaturated fatty acids having 2 to 50, in particular, 5 to 30 carbon atoms. Alkanolamine may be alkanol having 1 to 3 amino groups and 1 to 5 hydroxyl groups and having 2 to 50, in particular, 5 to 30 carbon atoms.

Polyhydric alcohol may be a 2 to 5-hydric alcohol having 10 to 30 carbon atoms.

Amine oxide may be an oxide (having, for example, 5 to 50 carbon atoms) of amine (secondary amine, or preferably tertiary amine).

It is preferable that the nonionic surfactant is a nonionic surfactant having an oxyalkylene group (preferably polyoxyethylene group). It is preferable that the number of carbon atoms of the alkylene group in the oxyalkylene group is 2 to 10. It is preferable that the number of oxyalkylene groups in a molecule of nonionic surfactant is usually 2 to 100.

It is preferable that the nonionic surfactant is selected from the group consisting of ether, ester, ester ether, alkanolamide, polyhydric alcohol and amine oxide, and the nonionic surfactant has an oxyalkylene group.

The nonionic surfactant may be an alkylene oxide adduct of a linear and/or branched aliphatic (saturated and/or unsaturated) group, a linear and/or branched fatty acid (saturated and/or unsaturated) polyalkylene glycol ester, a polyoxyethylene (POE)/polyoxypropylene (POP) copolymer (random copolymer or block copolymer), an alkylene oxide adduct of acetylene glycol, and the like. Of them, those in which the portion of the alkylene oxide adduct and the portion of polyalkylene glycol has a structure of polyoxyethylene (POE), polyoxypropylene (POP) or a POE/POP copolymer (either a random copolymer or a block copolymer) are preferred.

Furthermore, it is preferable that the nonionic surfactant has a structure without an aromatic group, in consideration of environmental problems (e.g., biodegradability, environmental hormone).

The nonionic surfactant may be a compound represented by the formula:

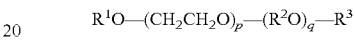

$$R^1O-(CH_2CH_2O)_p-(R^2O)_q-R^3$$

wherein $R^1$ is an alkyl group having 1 to 22 carbon atoms or an alkenyl group or acyl group having 2 to 22 carbon atoms, each $R^2$ is independently the same or a different alkylene group having 3 or more (e.g., 3 to 10) carbon atoms, $R^3$ is a hydrogen atom, an alkyl group having 1 to 22 carbon atoms or an alkenyl group having 2 to 22 carbon atoms, p is a number of 2 or more, and q is 0 or a number of 1 or more.

It is preferable that $R^1$ has 8 to 20, particularly 10 to 18 carbon atoms. Preferred examples of $R^1$ include a lauryl group, a tridecyl group and an oleyl group.

Examples of $R^2$ include a propylene group and a butylene group.

In the nonionic surfactant, p may be a number of 3 or more (e.g., 5 to 200). q may be a number of 2 or more (e.g., 5 to 200). In other words, $-(R^2O)_q-$ may form a polyoxyalkylene chain.

The nonionic surfactant may be polyoxyethylene alkylene alkyl ether having, at the center, a hydrophilic polyoxyethylene chain and a hydrophobic oxyalkylene chain (in particular, polyoxyalkylene chain). Examples of the hydrophobic oxyalkylene chain include oxypropylene chain, oxybutylene chain and styrene chain. Of them, oxypropylene chain is preferred.

Specific examples of the nonionic surfactants include a condensation product of ethylene oxide and hexylphenol, isooctylphenol, hexadecanol, oleic acid, alkane($C_{12}$-$C_{16}$) thiol, sorbitan monofatty acid ($C_7$-$C_{19}$), alkyl ($C_{12}$-$C_{18}$) amine or the like.

The ratio of the polyoxyethylene block may be 5 to 80% by weight, for example, 30 to 75% by weight, and in particular, 40 to 70% by weight, based on the molecular weight of the nonionic surfactant (copolymer).

The average molecular weight of the nonionic surfactant is usually 300 to 5,000, for example, 500 to 3,000.

The nonionic surfactant may be a single type or a mixture of two or more.

(3-2) Cationic Surfactant

It is preferable that the cationic surfactant is a compound which does not have an amide group.

The cationic surfactant may be an amine salt, a quaternary ammonium salt, or an oxyethylene adduct ammonium salt. Specific examples of the cationic surfactant include, but not limited to, amine salt surfactants such as an alkylamine salt, an amino alcohol fatty acid derivative, a polyamine fatty acid derivative and imidazoline, and quaternary ammonium salt surfactants such as alkyltrimethylammonium salt, dialkyldimethylammonium salt, alkyldimethylbenzylammonium salt, pyridinium salt, alkylisoquinolinium salt and benzethonium chloride.

Preferred examples of the cationic surfactant include:

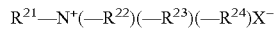

wherein $R^{21}$, $R^{22}$, $R^{23}$ and $R^{24}$ are a hydrocarbon group having 1 to 30 carbon atoms and X is an anionic group.

Specific examples of $R^{21}$, $R^{22}$, $R^{23}$ and $R^{24}$ include an alkyl group (e.g., a methyl group, a butyl group, a stearyl group and a palmityl group). Specific examples of X include halogen (e.g., chlorine) and acid (e.g., hydrochloric acid, acetic acid).

The cationic surfactant is preferably monoalkyltrimethylammonium salt (wherein alkyl has 4 to 30 carbon atoms).

It is preferable that the cationic surfactant is an ammonium salt. The cationic surfactant may be an ammonium salt represented by the formula:

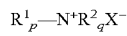

wherein $R^1$ is $C_{12}$ or more (e.g., $C_{12}$ to $C_{50}$) linear and/or branched aliphatic (saturated and/or unsaturated.) group, $R^2$ is H or a $C_1$ to $C_4$ alkyl group, a benzyl group, a polyoxyethylene group (wherein the number of oxyethylene groups is, for example, 1 (in particular 2, especially 3) to 50), preferably $CH_3$, $C_2H_5$, X is a halogen atom (e.g., chlorine) or a $C_1$ to $C_4$ fatty acid salt group, p is 1 or 2, q is 2 or 3, and p+q=4. The number of carbon atoms of $R^1$ may be 12 to 50, and for example, 12 to 30.

Specific examples of the cationic surfactant include dodecyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethylammonium chloride, methyldodecyldi(hydropolyoxyethylene)ammonium chloride, benzyldodecyldi(hydropolyoxyethylene)ammonium chloride and N-[2-(diethylamino) ethyl] oleamide hydrochloride.

Examples of the amphoteric surfactant include alanines, imidazolinium betaines, amide betaines and acetic acid betaines, which are specifically lauryl betaine, stearyl betaine, lauryl carboxymethyl hydroxyethyl imidazolinium betaine, lauryl dimethylaminoacetic acid betaine, and fatty acid amide propyldimethylaminoacetic acid betaine.

Each of the nonionic surfactant, the cationic surfactant and the amphoteric surfactant may be used alone or in combination of two or more.

The amount of the cationic surfactant may be 5% by weight or more, preferably 10% by weight or more, and more preferably 20% by weight or more, based on the total amount of the surfactants. The weight ratio of the nonionic surfactant and the cationic surfactant is preferably 95:5 to 20:80, and more preferably 85:15 to 40:60.

The amount of the cationic surfactant may be 0.05 to 10 parts by weight, and for example, 0.1 to 8 parts by weight, based on 100 parts by weight of the polymer. The total amount of the surfactants may be 0.1 to 20 parts by weight, and for example, 0.2 to 10 parts by weight, based on 100 parts by weight of the polymer.

(4) Additive

The water-repellent composition of the present invention may contain (4) an additive, in addition to the fluorine-containing polymer (1), the liquid medium (2), and if necessary, (3) the surfactant.

Examples of the additive (4) include other water-repellent agents, oil-repellent agents, drying rate modifiers, cross-linking agents, film forming auxiliaries, compatibilizers, surfactants, anti-freezing agents, viscosity modifiers, ultraviolet absorbers, antioxidants, pH adjusters, defoaming agents, feeling modifiers, slippage modifiers, anti-static agents, hydrophilizing agents, antibacterial agents, antiseptics, insecticides, fragrances and flame retardants.

The additive (4) may be a fluorine-containing polymer.

The water-repellent composition of the present invention may contain the above-mentioned fluorine-free polymer alone as a polymer (an active ingredient), while the composition may also contain a fluorine-containing polymer in addition to the above-mentioned fluorine-free polymer. Usually, particles made of the fluorine-free polymer and particles made of the fluorine-containing polymer are present separately in a water-repellent composition (in particular, an aqueous emulsion). More specifically, it is preferable that the fluorine-free polymer and the fluorine-containing polymer are produced separately, and then the fluorine-free polymer and the fluorine-containing polymer are mixed. It is preferable that usually an emulsion (in particular, an aqueous emulsion) of a fluorine-free polymer and an emulsion (in particular, an aqueous emulsion) of a fluorine-containing polymer are produced separately, and then the emulsion of a fluorine-free polymer and the emulsion of a fluorine-containing polymer are mixed.

The fluorine-containing polymer has a repeating unit derived from a fluorine-containing monomer. The fluorine-containing monomer is preferably an acrylate ester or acrylamide represented by the formula:

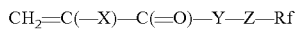

wherein X is a hydrogen atom, a linear or branched alkyl group having 1 to 21 carbon atoms, a fluorine atom, a chlorine atom, a bromine atom, an iodine atom, a $CFX^1X^2$ group (wherein $X^1$ and $X^2$ are a hydrogen atom, a fluorine atom, a chlorine atom, a bromine atom or an iodine atom), a cyano group, a linear or branched fluoroalkyl group having 1 to 21 carbon atoms, a substituted or non-substituted benzyl group, or a substituted or non-substituted phenyl group;

Y is —O— or —NH—;

Z is an aliphatic group having 1 to 10 carbon atoms, or an aromatic group or a cycloaliphatic group having 6 to 18 carbon atoms, a —$CH_2CH_2N(R^1)SO_2$— group (wherein $R^1$ is an alkyl group having 1 to 4 carbon atoms) or a —$CH_2CH(OZ^1)CH_2$— group (wherein $Z^1$ is a hydrogen atom or an acetyl group) or a —$(CH_2)_m$—SO—$(CH_2)_n$— group or a —$(CH_2)_m$—S—$(CH_2)_n$— group (wherein m is 1 to 10 and n is 0 to 10), and Rf is a linear or branched fluoroalkyl group having 1 to 20 carbon atoms.

It is preferable that the number of carbon atoms of the Rf group is 1 to 6, particularly 4 to 6, and especially 6.

The fluorine-containing polymer may also have a repeating unit derived from at least one fluorine-free monomer selected from the group consisting of a halogenated olefin monomer, a fluorine-free non-crosslinkable monomer and a fluorine-free crosslinkable monomer.

It is preferable that the halogenated olefin monomer is an olefin substituted with 1 to 10 chlorine atoms, bromine atoms or iodine atoms and having 2 to 20 carbon atoms.

Specific examples of the halogenated olefin monomer include halogenated vinyl such as vinyl chloride, vinyl bromide, vinyl iodide and halogenated vinylidene such as vinylidene chloride, vinylidene bromide and vinylidene iodide.

A preferred fluorine-free non-crosslinkable monomer is a compound represented by the formula:

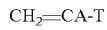

wherein A is a hydrogen atom, a methyl group or a halogen atom other than a fluorine atom (e.g., a chlorine atom, a bromine atom and an iodine atom), T is a hydrogen atom, a chain or cyclic hydrocarbon group having 1 to 20 carbon atoms, or a chain or cyclic organic group having an ester bond and having 1 to 20 carbon atoms. Specific examples of the fluorine-free non-crosslinkable monomer include alkyl (meth)acylate ester, ethylene, vinyl acetate, acrylonitrile, styrene, polyethylene glycol (meth)acrylate, polypropylene glycol (meth)acrylate, methoxypolyethylene glycol (meth)acrylate, methoxypolypropylene glycol (meth)acrylate and vinyl alkyl ether.

The fluorine-free crosslinkable monomer may be a compound having at least two carbon-carbon double bonds (e.g., a (meth)acrylic group), or a compound having at least one carbon-carbon double bond and at least one reactive group.

A weight ratio of the fluorine-free polymer to the fluorine-containing polymer in the water-repellent composition may be 100:0 to 10:90, for example, 90:10 to 20:80, and preferably 80:20 to 30:70.

Each of the fluorine-free polymer and the fluorine-containing polymer may be a single polymer, or may be a combination of two or more polymers.

When the fluorine-free polymer and the fluorine-containing polymer are used in combination, the properties (in particular, water-repellency) equal to or higher than those provided by the fluorine-free polymer alone can be obtained.

The polymers in the present invention (the polymer which does not have a fluoroalkyl group, in particular, the fluorine-free polymer, and the fluorine-containing polymer, in particular, the copolymer having a fluoroalkyl group) may be produced by any usual polymerization method. Furthermore, conditions of polymerization reaction may be optionally selected. Such polymerization method includes a solution polymerization, a suspension polymerization and an emulsion polymerization. The emulsion polymerization is preferred.

As long as the water-repellent composition of the present invention is in the form of an aqueous emulsion, the method for producing the polymer is not limited. For example, the polymer is produced by the solution polymerization and then the solvent is removed and a surfactant and water are added thereto to give an aqueous emulsion.

For the solution polymerization, a method may be used, in which a monomer is dissolved in an organic solvent in the presence of a polymerization initiator and after substitution with nitrogen, the solution is heated and stirred at 30 to 120° C. for 1 to 10 hours. Examples of the polymerization initiator include azobisisobutyronitrile, benzoyl peroxide, di-t-butyl peroxide, lauryl peroxide, cumene hydroperoxide, t-butyl peroxypivalate and diisopropyl peroxydicarbonate. The polymerization initiator may be used in an amount of 0.01 to 20 parts by weight, for example, 0.01 to 10 parts by weight, based on 100 parts by weight of the monomer.

The organic solvent is inert to monomers and dissolves them. Examples of the organic solvent may include esters (e.g., esters having 2 to 30 carbon atoms, such as ethyl acetate and butyl acetate), ketones (e.g., ketones having 2 to 30 carbon atoms such as methyl ethyl ketone and diisobutyl ketone), and alcohols (e.g., alcohols having 1 to 30 carbon atoms, such as isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in an amount of 10 to 2,000 parts by weight, for example, 50 to 1,000 parts by weight, based on 100 parts by weight of total of the monomer.

For the emulsion polymerization, a method may be used, in which the monomer is emulsified in water in the presence of a polymerization initiator and an emulsifier and after substitution with nitrogen, the emulsion is stirred at 50 to 80° C. for 1 to 10 hours to perform polymerization. The method can use a water-soluble polymerization initiator such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine-dihydrochloride, azobisisobutyronitrile, sodium peroxide, potassium persulfate and ammonium persulfate, or an oil-soluble polymerization initiator such as azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator may be used in an amount of 0.01 to 10 parts by weight based on 100 parts by weight of the monomer.

To obtain an aqueous dispersion of polymer having excellent standing stability, it is desirable that monomers are formed into fine particles in water and then polymerized using an emulsification apparatus such as a high pressure homogenizer or an ultrasonic homogenizer, which can produce a high crushing energy. Furthermore, various anionic, cationic or nonionic emulsifiers may be used as an emulsifier, in an amount of 0.5 to 20 parts by weight, based on 100 parts by weight of the monomer. It is preferable to use an anionic and/or a nonionic and/or a cationic emulsifier. When monomers are not completely compatible, a compatibilizer capable of thoroughly compatibilizing those monomers, for example, a water-soluble organic solvent or a low molecular weight monomer, is preferably added. Addition of the compatibilizer improves emulsifiability and copolymerizability.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in an amount of 1 to 50 parts by weight, for example, 10 to 40 parts by weight, based on 100 parts by weight of water. Examples of the low molecular weight monomer include methyl methacrylate, glycidyl methacrylate and 2,2,2-trifluoroethyl methacrylate. The low molecular weight monomer may be used in an amount of 1 to 50 parts by weight, for example, 10 to 40 parts by weight, based on 100 parts by weight of total of the monomer.

A chain transfer agent may be used in polymerization. The molecular weight of the polymer can be changed depending on the amount to be used of the chain transfer agent. Examples of the chain transfer agent include mercaptan group-containing compounds (in particular, alkyl mercaptan, for example, having 1 to 30 carbon atoms) such as lauryl mercaptan, thioglycol and thioglycerol, and inorganic salts such as sodium hypophosphite and sodium bisulfite. The chain transfer agent may be used in an amount of 0.01 to 10 parts by weight, for example, 0.1 to 5 parts by weight, based on 100 parts by weight of total of the monomer.

The water-repellent composition of the present invention may be in the form of a solution, an emulsion (in particular, an aqueous dispersion) or an aerosol, and a solution or an aqueous dispersion is preferred. The water-repellent composition comprises a polymer (an active ingredient of the water-repellent composition) and a medium (in particular, a liquid medium, for example, an organic solvent and/or water). For example, the amount of the medium may be 5 to 99.9% by weight, in particular, 10 to 80% by weight, based on the water-repellent composition.

The concentration of the polymer may be 0.01 to 95% by weight, and for example, 5 to 50% by weight, in the water-repellent composition.

The water-repellent composition of the present invention may be used as an external treatment agent (surface treatment agent) or an internal treatment agent.

When the water-repellent composition of the present invention is in the form of the external treatment agent, the composition may be applied to a substrate to be treated by a conventionally known method. Usually, the composition can be used in a method wherein the water-repellent composition is diluted by dispersing in an organic solvent or water, and the resultant is applied to the surface of the substrate to be treated by a known process such as dip coating, spray coating or foam coating, and dried. Alternatively, if necessary, the composition may be applied to the substrate together with a suitable cross-linking agent (e.g., a blocked isocyanate) and cured. Furthermore, an insecticide, a softening agent, an antibacterial agent, a flame retardant, an anti-static agent, a coating fixative, a wrinkle-resistant agent or the like may be added to the water-repellent composition of the present invention to be used in combination. The concentration of the polymer in a treatment liquid to be brought into contact with the substrate may be 0.01 to 10% by weight (in the case of, in particular, dip coating), and for example, 0.05 to 10% by weight.

Examples of the substrate to be treated with the treatment agent composition (the water-repellent composition) of the present invention include textile products, stone materials, filters (e.g., electrostatic filters), dust masks, parts of fuel cells (e.g., gas diffusion electrodes and gas diffusion backings), glass, paper, wood, leather, fur, asbestos, bricks, cement, metal, oxide, ceramic products, plastic, coated surfaces and plaster. Examples of the textile product include various items. Examples of the textile product include animal and plant natural fibers such as cotton, hemp, wool and silk, synthetic fibers such as polyamide, polyester, polyvinyl alcohol, polyacrylonitrile, polyvinyl chloride and polypropylene, semi-synthetic fibers such as rayon and acetate, inorganic fibers such as glass fiber, carbon fiber and asbestos fiber, and a mixed fiber thereof.

Textile products may be in the form of fiber, fabric or the like.

The water-repellent composition of the present invention may also be used as a soil resistant agent, a peeling agent, or a release agent (e.g., an internal release agent or an external release agent). The surface of a substrate, for example, can be easily peeled off of another surface (another surface of the substrate, or the surface of another substrate).

The polymer may be applied to a fibrous substrate (e.g., a textile product) by any known method for treating a textile product with liquid. When the textile product is a fabric, the fabric may be dipped in a solution, or a solution may be applied to or sprayed on the fabric. The textile product treated is dried and preferably heated at, for example, 100° C. to 200° C. for water-repellency to be exhibited.

Alternatively, the polymer may be applied to the textile product in a cleaning method. The polymer may be applied to the textile product, for example, during washing or in a dry cleaning method.

The textile product to be treated is typically a fabric, including a woven fabric, a knitted fabric and a non-woven fabric, a fabric in the form of clothing, and a carpet. The textile product may also be a fiber, a yarn or an intermediate textile product (e.g., a sliver or a roving). Materials of the textile product may be a natural fiber (e.g., cotton or wool), a chemical fiber (e.g., viscose rayon or lyocell), or a synthetic fiber (e.g., polyester, polyamide or acrylic fiber), or may be a mixture of fibers (e.g., a mixture of the natural fiber and the synthetic fiber). It is preferable that the textile product is the carpet.

Alternatively, the fibrous substrate may also be a leather. To make the leather hydrophobic and lipophobic, an aqueous solution or an aqueous emulsion of the polymer produced may be applied to the leather at various stages of leather processing, for example, in the period of wetting processing of the leather or finishing of the leather.

Alternatively, the fibrous substrate may be paper. The polymer produced may be applied to the paper which has been previously prepared, or may be applied to the paper at various stages of paper making, for example, in the period of drying of paper.

The "treatment" means application of the treatment agent to the substrate to be treated by, for example, dipping, spraying, or coating. The treatment allows the polymer, which is the active ingredient of the treatment agent, to penetrate into the inside of the substrate and/or to adhere to the surface of the substrate.

When the water-repellent composition is in the form of the internal treatment agent, the water-repellency can be given to a resin, for example a thermoplastic resin, by adding the composition to the resin. The water-repellent composition may be used when producing a molded article of the resin.

The liquid medium is removed from a liquid (a solution or a dispersion) comprising the polymer to give the polymer. For example, the dispersion of the polymer (an aqueous dispersion or a dispersion in an organic solvent) is subjected to re-precipitation with water or an organic solvent and then the resultant is dried to give the polymer.

A molded article can be produced by, for example, a method comprising preparing a resin composition by mixing the resin and the polymer and molding the resin composition. It is preferable that a molded article is produced by melting and kneading by using, for example, an extruder.

In general, the thermoplastic resin and the polymer are compatible in a molten state. Kneading can be performed by a conventionally known method using, for example, a single screw extruder, a twin screw extruder or a roll. The resin composition obtained as described above is extrusion-molded, injection-molded, compression-molded, blow-molded, or molded by a press or the like. The resin composition is molded into molded articles of various shapes. The resulting molded article may be further heated in, for example, an oven or a drying furnace after molding processing. The molded article may have a single layer or multilayers of 2 to 10 layers, and for example, 3 to 5 layers.

The molded article can be used for the application in which a thermoplastic resin is used, more specifically, an application in which the resin preferably offers high convenience of wiping off stains and excellent scratch resistance.

Examples of the application of the molded article include automobiles (exterior and interior parts)(e.g., bumpers, instrumental panels, door trims), household electric appliances (e.g., washing machines, refrigerators)(including housings, doors, trays and vegetable compartment containers in refrigerators), various cases, building materials (interior materials and parts) (e.g., handrails, wall papers, tables, chairs, toilet sheets and sheet covers, bath tubs), electronic appliances (e.g., housings of smartphones), drainage ditches, pipes, tableware, floor materials, gasoline tanks, fuel hoses and OA equipments. Among them, automobile interior parts, interior parts of household electric appliances and building materials are more preferred.

EXAMPLES

Hereinafter the present invention will be described in more detail with reference to Examples, but the present invention is not limited to these Examples.

In the following, part(s), %, or ratio(s) mean part(s) by weight, % by weight, or weight ratio(s), unless otherwise noted.

The procedure of the test is as follows.

Water-Repellency Test

A treatment liquid having a solid concentration of 1.5% was prepared, and a test fabric was prepared by dipping a piece of fabric in the test solution, then putting it through a mangle, and heat-treating at 160° C. for 2 minutes, and water-repellency of the test fabric was evaluated. Water-repellency of the fabric treated thus was evaluated, based on the spray test according to JIS-L-1092 (AATCC-22). The result is described as water-repellency No. as shown in the following table. A higher score indicates a higher level of water-repellency.

| Water-repellency No. | State |
|---|---|
| 100 | Surface not wet, without drop of water |
| 90 | Surface not wet, but with small drop of water |
| 80 | Surface wet, with small drop of water |
| 70 | Half of surface wet, with small wet portions penetrating fabric |
| 50 | Entire surface wet |
| 0 | Both of front surface and rear surface wet |

Gum Up Ratio Test

A dispersion of the polymer is diluted with hard water B (hardness 16: calcium chloride 1.9425 g, magnesium chloride 0.3975 g, sodium sulfate 4.63 g/water 10 L) so that the solid concentration is 5% by weight to prepare 1,000 g of a diluted liquid. The diluted liquid is placed in a pad whose temperature can be adjusted to 40° C. A polyester fabric having a width of 20 cm and a length of 80 cm in a loop is continuously treated through a mangle at a mangle pressure of 0.4 MPa for 1 hour. The gum up ratio is determined by the following equation.

(Amount of gum up on mangle)=(Weight of polyester fabric before treatment+weight of solid content of diluted liquid before treatment)−(Weight of polyester fabric after treatment+weight of solid content of diluted liquid after treatment)

(Gum up ratio)=100×(Amount of gum up on mangle)/(Weight of solid content of diluted liquid before treatment)

A gum up ratio of less than 4% shows suppression of gum up (good processing stability).

Production Example 1

A 200 cc four-neck flask equipped with a nitrogen introducing tube, a thermometer, a stirring rod and a reflux tube was charged with 40 g of C18SHA, 0.04 g of lauryl mercaptan and 56 g of toluene, and the mixture was stirred in nitrogen stream at room temperature for 30 minutes. Subsequently, a solution prepared by dissolving 0.4 g of AIBN (azobisisobutyronitrile) in 4 g of toluene was added thereto, and the temperature of the mixture was increased to 80° C. and polymerization reaction was performed for 8 hours. After the polymerization, toluene was additionally added thereto to prepare a toluene solution having a solid concentration of 20%.

Production Examples 2 to 7

Polymerization was performed with the ingredients shown in Table 1 in the same manner as in Production Example 1. After the polymerization, the resultant was diluted with toluene to prepare a toluene solution having a solid concentration of 20%.

Comparative Production Examples 1 and 2

Polymerization was performed with the ingredients shown in Table 1 in the same manner as in Production Example 1. After the polymerization, the resultant was diluted with toluene to prepare a toluene solution having a solid concentration of 20%.

Production Example 8

17 g of tripropylene glycol, 59 g of C18SHA, 1 g of N-methylolacrylamide, 136 g of pure water, 0.6 g of dimethyldioctadecylammonium chloride, 1 g of sorbitan monooleate, 2 g of polyoxyethylene tridecyl ether and 2.4 g of polyoxyethylene lauryl ether were fed into a 500 ml plastic container. The mixture was heated to 80° C. and stirred with a homomixer at 2,000 rpm for 1 minute, and then emulsified and dispersed with ultrasonic waves for 15 minutes. The emulsified dispersion was transferred to a 500 cc four-neck flask equipped with a nitrogen introducing tube, a thermometer, a stirring rod and a reflux tube, and after substitution with nitrogen, the flask was charged with 0.1 g of lauryl mercaptan and the mixture was stirred. Then, 0.6 g of 2,2-azobis(2-amidinopropane) dihydrochloride was further added thereto, and the mixture was heated to 60° C. and reacted for 4 hours to give an aqueous dispersion of the polymer. Subsequently, pure water was added thereto to prepare an aqueous dispersion having a solid concentration of 20%.

Production Examples 9 to 11

Polymerization was performed with the ingredients shown in Table 2 in the same manner as in Production Example 8. After the polymerization, the resultant was diluted with pure water to prepare an aqueous dispersion having a solid concentration of 20%.

Production Example 12

30 g of tripropylene glycol, 45 g of C18SHA, 34 g of stearyl acrylate, 1 g of N-methylolacrylamide, 180 g of pure water, 2 g of trimethyloctadecylammonium chloride, 2 g of sorbitan monooleate, 2.5 g of polyoxyethylene tridecyl ether and 3.5 g of polyoxyethylene lauryl ether were fed into a 500 ml plastic container. The mixture was heated to 80° C. and stirred with a homomixer at 2,000 rpm for 1 minute, and then emulsified and dispersed with ultrasonic waves for 15 minutes. The emulsified dispersion was transferred to a 500 ml autoclave, and after substitution with nitrogen, 0.2 g of lauryl mercaptan and 20 g of vinyl chloride were fed thereinto. 1 g of 2,2-azobis(2-amidinopropane) dihydrochloride was further added thereto, and the mixture was heated to 60° C. and reacted for 4 hours to give an aqueous dispersion of the polymer. The dispersion was further diluted with pure water to prepare an aqueous dispersion having a solid concentration of 20%.

Production Examples 13 to 16

Polymerization was performed with the ingredients shown in Table 2 in the same manner as in Production Example 12. After the polymerization, the resultant was further diluted with pure water to prepare an aqueous dispersion having a solid concentration of 201.

Comparative Production Examples 3 and 4

Polymerization was performed with the ingredients shown in Table 2 in the same manner as in Production Example 12. After the polymerization, the resultant was further diluted with pure water to prepare an aqueous dispersion having a solid concentration of 20%.

Comparative Production Example 5

Polymerization was performed with the ingredients shown in Table 2 in the same manner as in Production Example 8. After the polymerization, the resultant was further diluted with pure water to prepare an aqueous dispersion having a solid concentration of 20%.

The meaning of abbreviations is as follows:

| Abbreviation | Name of compound |
| --- | --- |
| C16SHA | Palmitic acid amide ethyl acrylate (palmitic acid amide group-containing acrylate) |
| C18SHA | Stearic acid amide ethyl acrylate (stearic acid amide group-containing acrylate) |
| StA | Stearyl acrylate |
| IBMA | Isobornyl methacrylate |
| N-MAM | N-methylolacrylamide |
| AAEM | 2-Acetoacetoxyethyl methacrylate |
| HEAA | Hydroxyethylacrylamide |
| VCM | Vinyl chloride |
| AIBN | Azobisisobutyronitrile |
| LiSH | Lauryl mercaptan |

TABLE 1

|  | Prod. Ex. 1 | Prod. Ex. 2 | Prod. Ex. 3 | Prod. Ex. 4 | Prod. Ex. 5 | Prod. Ex. 6 | Prod. Ex. 7 | Com. Prod. Ex. 1 | Com. Prod. Ex. 2 |
| --- | --- | --- | --- | --- | --- | --- | --- | --- | --- |
| C16SHA |  |  |  |  | 40 | 20 | 12 |  |  |
| C18SHA | 40 | 20 | 35 | 20 |  |  | 28 |  |  |
| IBMA |  |  | 5 | 5 |  |  |  |  | 5 |
| StA |  | 20 |  | 15 |  | 20 |  | 40 | 35 |
| LSH | 0.04 | 0.04 | 0.04 | 0.04 | 0.04 | 0.04 | 0.04 | 0.04 | 0.04 |
| Toluene | 56 | 56 | 56 | 56 | 56 | 56 | 56 | 56 | 56 |
| Toluene (for diluting AIBN) | 4 | 4 | 4 | 4 | 4 | 4 | 4 | 4 | 4 |
| AIBN | 0.4 | 0.4 | 0.4 | 0.4 | 0.4 | 0.4 | 0.4 | 0.4 | 0.4 |

Numerals in table indicate weight (gram)

TABLE 2

|  | Prod Ex. 8 | Prod. Ex. 9 | Prod. Ex. 10 | Prod. Ex. 11 | Prod. Ex. 12 | Prod. Ex. 13 | Prod. Ex. 14 | Prod. Ex. 15 | Prod. Ex. 16 | Com. Prod. Ex. 3 | Com. Prod. Ex. 4 | Com. Prod. Ex. 5 |
| --- | --- | --- | --- | --- | --- | --- | --- | --- | --- | --- | --- | --- |
| C16SHA |  |  |  | 40 |  |  | 13.5 |  |  |  |  |  |
| C18SHA | 59 | 30 | 30 |  | 45 | 45 | 31.5 | 20 | 5 |  |  |  |
| IBMA |  |  | 5 |  |  | 5 | 5 |  | 5 |  | 5 |  |
| StA |  | 29 | 24 | 20 | 34 | 29 | 29 | 59 | 69 | 79 | 74 | 59 |
| N-MAM | 1 | 1 |  |  | 1 | 1 | 1 | 1 | 1 | 1 | 1 | 1 |
| AAEM |  |  | 1 | 0.5 |  |  |  |  |  |  |  |  |
| HEAA |  |  |  | 0.5 |  |  |  |  |  |  |  |  |
| VCM |  |  |  |  | 20 | 20 | 20 | 20 | 20 | 20 | 20 |  |
| 2,2-Azobis(2-amidinopropane) dihydrochloride | 0.6 | 0.6 | 0.6 | 0.6 | 1 | 1 | 1 | 1 | 1 | 1 | 1 | 0.6 |
| LSH | 0.1 | 0.1 | 0.1 | 0.1 | 0.2 | 0.2 | 0.2 | 0.2 | 0.2 | 0.2 | 0.2 | 0.1 |
| Tripropylene glycol | 17 | 17 | 17 | 17 | 30 | 30 | 30 | 30 | 30 | 30 | 30 | 17 |
| Dimethyldioctadecyl ammonium chloride | 0.6 | 0.6 | 0.6 | 0.6 |  |  |  |  |  |  |  | 0.6 |
| Trimethyloctadecyl ammonium chloride |  |  |  |  | 2 | 2 | 2 | 2 | 2 | 2 | 2 |  |
| Sorbitan monooleate | 1 | 1 | 1 | 1 | 2 | 2 | 2 | 2 | 2 | 2 | 2 | 1 |
| Polyoxyethylene tridecyl ether | 2 | 2 | 2 | 2 | 2.5 | 2.5 | 2.5 | 2.5 | 2.5 | 2.5 | 2.5 | 2 |

TABLE 2-continued

|  | Prod. Ex. 8 | Prod. Ex. 9 | Prod. Ex. 10 | Prod. Ex. 11 | Prod. Ex. 12 | Prod. Ex. 13 | Prod. Ex. 14 | Prod. Ex. 15 | Prod. Ex. 16 | Com. Prod. Ex. 3 | Com. Prod. Ex. 4 | Com. Prod. Ex. 5 |
|---|---|---|---|---|---|---|---|---|---|---|---|---|
| Polyoxyethylene lauryl ether | 2.4 | 2.4 | 2.4 | 2.4 | 3.5 | 3.5 | 3.5 | 3.5 | 3.5 | 3.5 | 3.5 | 2.4 |
| Pure water | 136 | 136 | 136 | 136 | 180 | 180 | 180 | 180 | 180 | 180 | 180 | 136 |

Numerals in table indicate weight (gram)

Test Example 1

The toluene solution 1 having a solid concentration of 20% prepared in Production Example 1 was further diluted with toluene to prepare a treatment liquid having a solid concentration of 1.5%. A piece of polyester fabric (gray) and a piece of nylon fabric (black) were dipped in the treatment liquid, and then lightly dehydrated by a centrifugal dehydrator for about 10 minutes. The wet pick up was about 65% (polyester fabric) and about 40% (nylon fabric). The fabric treated thus was put through a pin tenter at 170° C. for 1 minute, dried and cured. The fabric treated thus was dried at room temperature overnight, and further heat-treated by putting it through the pin tenter at 170° C. for 1 minute. The water-repellency of the test fabrics treated as described above was evaluated based on the water-repellency test by the spray test according to JIS L-1092. The results of water-repellency are shown in Table 3.

Test Examples 2 to 7

The toluene solutions 2 to 7 having a solid concentration of 20% prepared in Production Examples 2 to 7 were diluted with toluene in the same manner as in Test Example 1 (solid concentration 1.5%), and fabric was treated and the water-repellency test was performed in the same manner as in Test Example 1. The results are shown in Table 3.

Comparative Test Examples 1 and 2

The toluene solutions having a solid concentration of 20% prepared in Comparative Production Examples 1 and 2 were diluted with toluene in the same manner as in Test Example 1 so that the solid concentration was 1.5%, and the fabric was treated and the water-repellency test was performed in the same manner as in Test Example 1. The results are shown in Table 3.

Test Example 8

The aqueous dispersion 8 having a solid concentration of 20% prepared in Production Example 8 was further diluted with tap water to prepare a treatment liquid having a solid concentration of 1.5%. A piece of polyester fabric (gray) and a piece of nylon fabric (black) were dipped in the treatment liquid, and then were squeezed through a mangle. The wet pick up was about 55% (polyester fabric) and about 35% (nylon fabric). The fabric treated thus was put through a pin tenter at 170° C. for 1 minute, dried and cured.

The water-repellency of the test fabrics treated as described above was evaluated based on the water-repellency test by the spray test according to JIS L-1092. The results of water-repellency are shown in Table 4.

Furthermore, the results of evaluation of water-repellency of the test fabric which was washed 10 times and then dried in a tumbler (at 60° C. for 30 minutes), according to JIS L-0217 103 are shown in Table 4.

Test Examples 9 to 16

The aqueous dispersions having a solid concentration of 20% prepared in Production Examples 9 to 16 were diluted with tap water in the same manner as in Test Example 8 so that the solid concentration was 1.5% to prepare a treatment liquid. Fabric was treated with this treatment liquid and the water-repellency test was performed in the same manner as in Test Example 8. The results are shown in Table 4.

Comparative Test Examples 3 to 5

The aqueous dispersions having a solid concentration of 20% prepared in Comparative Production Examples 3 to 5 were diluted with tap water in the same manner as in Test Example 8 so that the solid concentration was 1.5% to prepare a treatment liquid. Fabric was treated with the treatment liquid and the water-repellency test was performed in the same manner as in Test Example 8. The results are shown in Table 4.

Measurement of Gum Up Ratio

The results of measurement of the gum up ratio in Production Examples 8, 9 and 13 and Comparative Production Examples 3 to 5 are shown in Table 4.

TABLE 3

|  |  | Test Ex. 1 | Test Ex. 2 | Test Ex. 3 | Test Ex. 4 | Test Ex. 5 | Test Ex. 6 | Test Ex. 7 | Com. Test Ex. 1 | Com. Test Ex. 2 |
|---|---|---|---|---|---|---|---|---|---|---|
| Water-repellency | Polyester fabric (gray) | 100 | 100 | 100 | 100 | 90-100 | 90-100 | 100 | 80 | 80 |
|  | Nylon fabric (black) | 100 | 90-100 | 100 | 90-100 | 90-100 | 90-100 | 90-100 | 70 | 80 |

TABLE 4

| | | Test Ex. 8 | Test Ex. 9 | Test Ex. 10 | Test Ex. 11 | Test Ex. 12 | Test Ex. 13 | Test Ex. 14 | Test Ex. 15 | Test Ex. 16 | Com. Test Ex. 3 | Com. Test Ex. 4 | Com. Test Ex. 5 |
|---|---|---|---|---|---|---|---|---|---|---|---|---|---|
| Water-repellency | Polyester fabric (gray) | 100 | 100 | 100 | 90-100 | 100 | 100 | 100 | 100 | 90-100 | 90 | 90 | 90 |
| | Nylon fabric (black) | 100 | 90-100 | 100 | 90-100 | 100 | 100 | 90-100 | 90-100 | 90-100 | 80 | 80 | 80 |
| | Nylon fabric (black) after washing 10 times | 80 | 80 | 80 | 80 | 80-90 | 80-90 | 80 | 80 | 80 | 70 | 70 | 50-70 |
| Gum up ratio (%) | | 1.6 | 1.9 | — | — | — | 2.3 | — | — | — | — | 6.7 | 4.2 |

INDUSTRIAL APPLICABILITY

The water-repellent composition of the present invention can be used as an external treatment agent (surface treatment agent) or an internal treatment agent. The treatment agent according to the present invention can be suitably used for substrates such as textile products and masonry, and gives excellent water-repellency to the substrate.

The invention claimed is:

1. A water-repellent composition comprising:
   (1) a polymer comprising
      (a) 2 to 100% by weight, based on the polymer, of a repeating unit derived from an amide group-containing monomer represented by the formula:

[Formula 1]

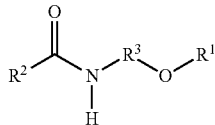

wherein $R^1$ is an organic residue having an ethylenically unsaturated polymerizable group,
   $R^2$ is a hydrocarbon group having 7 to 30 carbon atoms, and
   $R^3$ is a hydrocarbon group having 1 to 5 carbon atoms; and
   (2) a liquid medium.

2. The water-repellent composition according to claim 1, wherein, in the monomer (a), $R^1$ is $-C(=O)CR^{11}=CH_2$ wherein $R^{11}$ is a hydrogen atom or a methyl group.

3. The water-repellent composition according to claim 1, wherein the polymer (1) further comprises a repeating unit derived from a polymerizable monomer other than the monomer (a), and the polymerizable monomer other than the monomer (a) is a compound represented by the formula:

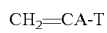

wherein A is a hydrogen atom, a methyl group, a chlorine atom, a bromine atom or an iodine atom,
   T is a hydrogen atom, a chlorine atom, a bromine atom, an iodine atom, a chain or cyclic hydrocarbon group having 1 to 40 carbon atoms, or a chain or cyclic organic group having an ester bond and having 2 to 41 carbon atoms.

4. The water-repellent composition according to claim 3, wherein the polymerizable monomer other than the monomer (a) is at least one selected from the group consisting of:
   (b) an acrylate ester monomer,
   (c) a fluorine-free crosslinkable monomer, and
   (d) a halogenated olefin.

5. The water-repellent composition according to claim 4, wherein another acrylate ester monomer (b) is at least one selected from the group consisting of:
   (b1) an acrylate ester monomer containing an aliphatic hydrocarbon group, and
   (b2) an acrylate ester monomer containing a cyclic hydrocarbon group.

6. The water-repellent composition according to claim 4, wherein the fluorine-free crosslinkable monomer (c) is a compound comprising at least two ethylenically unsaturated double bonds, or a compound comprising at least one ethylenically unsaturated double bond and at least one reactive group.

7. The water-repellent composition according to claim 4, wherein the halogenated olefin monomer (d) is at least one selected form the group consisting of vinyl chloride and vinylidene chloride.

8. The water-repellent composition according to claim 4, wherein, in the polymer, the amount of the repeating unit (b) is 0 to 200 parts by weight, the amount of the repeating unit (c) is 0 to 50 parts by weight, and the amount of the repeating unit (d) is 0 to 100 parts by weight, based on 100 parts by weight of the monomer (a).

9. The water-repellent composition according to claim 1, wherein the liquid medium (2) is water, an organic solvent, or a mixture of water and an organic solvent.

10. The water-repellent composition according to claim 1, which is an external treatment agent or an internal treatment agent.

11. A method for treating a substrate, comprising treating the substrate with the water-repellent composition according to claim 1.

12. A method for producing a treated textile product, comprising treating a textile product with the water-repellent composition according to claim 1.

* * * * *